US008894121B2

(12) United States Patent
Eilers et al.

(10) Patent No.: US 8,894,121 B2
(45) Date of Patent: Nov. 25, 2014

(54) TABLE WITH A ROTATABLE TABLETOP

(71) Applicants: Benjamin C. Eilers, Monroe, WA (US);
Benjamin T. Grover, Maple Valley, WA
(US); Jonathan Duncan, Seattle, WA
(US); Wallace A. Peltola, Sammamish,
WA (US)

(72) Inventors: Benjamin C. Eilers, Monroe, WA (US);
Benjamin T. Grover, Maple Valley, WA
(US); Jonathan Duncan, Seattle, WA
(US); Wallace A. Peltola, Sammamish,
WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 13/800,956

(22) Filed: Mar. 13, 2013

(65) Prior Publication Data
US 2014/0261097 A1 Sep. 18, 2014

(51) Int. Cl.
B60R 7/04 (2006.01)
B60N 3/00 (2006.01)

(52) U.S. Cl.
CPC .. B60N 3/001 (2013.01); B60R 7/04 (2013.01)
USPC ........ 296/24.34; 224/282; 224/553; 224/564; 248/349.1; 248/425; 108/44

(58) Field of Classification Search
CPC .......... B60N 3/001; B60N 3/002; B60R 7/04; B60R 7/08; A47B 11/00
USPC .......................... 296/24.34, 37.1, 37.8, 37.16; 224/42.32, 275, 282, 553, 564; 312/240, 241, 319.1, 319.2; 248/346.01, 349.1, 415, 425; 108/42, 108/44, 139, 142
See application file for complete search history.

(56) References Cited

U.S. PATENT DOCUMENTS

| 1,775,577 | A | * | 9/1930 | Wilson | .......................... 108/142 |
| 1,844,664 | A | * | 2/1932 | Larson | .......................... 108/142 |
| 1,963,467 | A | * | 6/1934 | Keller | ............................ 108/141 |
| 3,391,960 | A | * | 7/1968 | Megargle et al. | ............. 296/24.3 |
| 3,754,604 | A | | 8/1973 | Inaba | |
| 4,359,004 | A | * | 11/1982 | Chappell | .......................... 108/44 |
| 4,524,701 | A | * | 6/1985 | Chappell | .......................... 108/44 |
| 4,672,898 | A | | 6/1987 | Davidson | |
| 5,505,600 | A | | 4/1996 | Ureshino | |
| 5,947,416 | A | * | 9/1999 | Kraft | ........................... 244/118.5 |
| 6,082,269 | A | | 7/2000 | Padberg | |
| 6,101,966 | A | | 8/2000 | Cumisky | |
| 6,382,745 | B1 | * | 5/2002 | Adkins | ...................... 312/223.3 |
| 6,554,354 | B1 | * | 4/2003 | Hoffman et al. | .............. 297/145 |
| 7,121,514 | B2 | | 10/2006 | Twyford | |
| 7,124,992 | B1 | | 10/2006 | Colledge | |
| 7,520,552 | B2 | * | 4/2009 | Nakamura et al. | ......... 296/24.34 |
| 7,588,278 | B1 | | 9/2009 | Luneack | |
| 7,757,613 | B2 | | 7/2010 | Fisher | |
| 7,798,073 | B2 | | 9/2010 | Swailes | |

(Continued)

FOREIGN PATENT DOCUMENTS

GB 190600100 A 12/1906
GB 191165 A 1/1923

(Continued)

Primary Examiner — Glenn Dayoan
Assistant Examiner — Jason S Daniels
(74) Attorney, Agent, or Firm — Christenson O'Connor Johnson Kindness PLLC

(57) ABSTRACT

A table having a vertical support structure and a tabletop that is rotatable relative to the vertical support structure. The rotatable tabletop is configured to lock and unlock at a variety of positions relative to the vertical support structure via a latch mechanism.

17 Claims, 10 Drawing Sheets

(56) References Cited

U.S. PATENT DOCUMENTS

| | | | |
|---|---|---|---|
| 8,517,443 B2* | 8/2013 | Hipshier et al. | 296/24.34 |
| 2006/0016372 A1 | 1/2006 | Younse | |
| 2008/0083352 A1 | 4/2008 | Tovani | |
| 2008/0223261 A1 | 9/2008 | Frederick | |
| 2008/0250983 A1 | 10/2008 | Sundarrao | |
| 2009/0249982 A1 | 10/2009 | Palethorpe | |
| 2012/0279427 A1* | 11/2012 | Helle | 108/142 |

FOREIGN PATENT DOCUMENTS

| | | |
|---|---|---|
| GB | 252960 A | 6/1926 |
| GB | 2 447 712 A | 9/2008 |
| JP | 9-277939 A | 10/1997 |

* cited by examiner

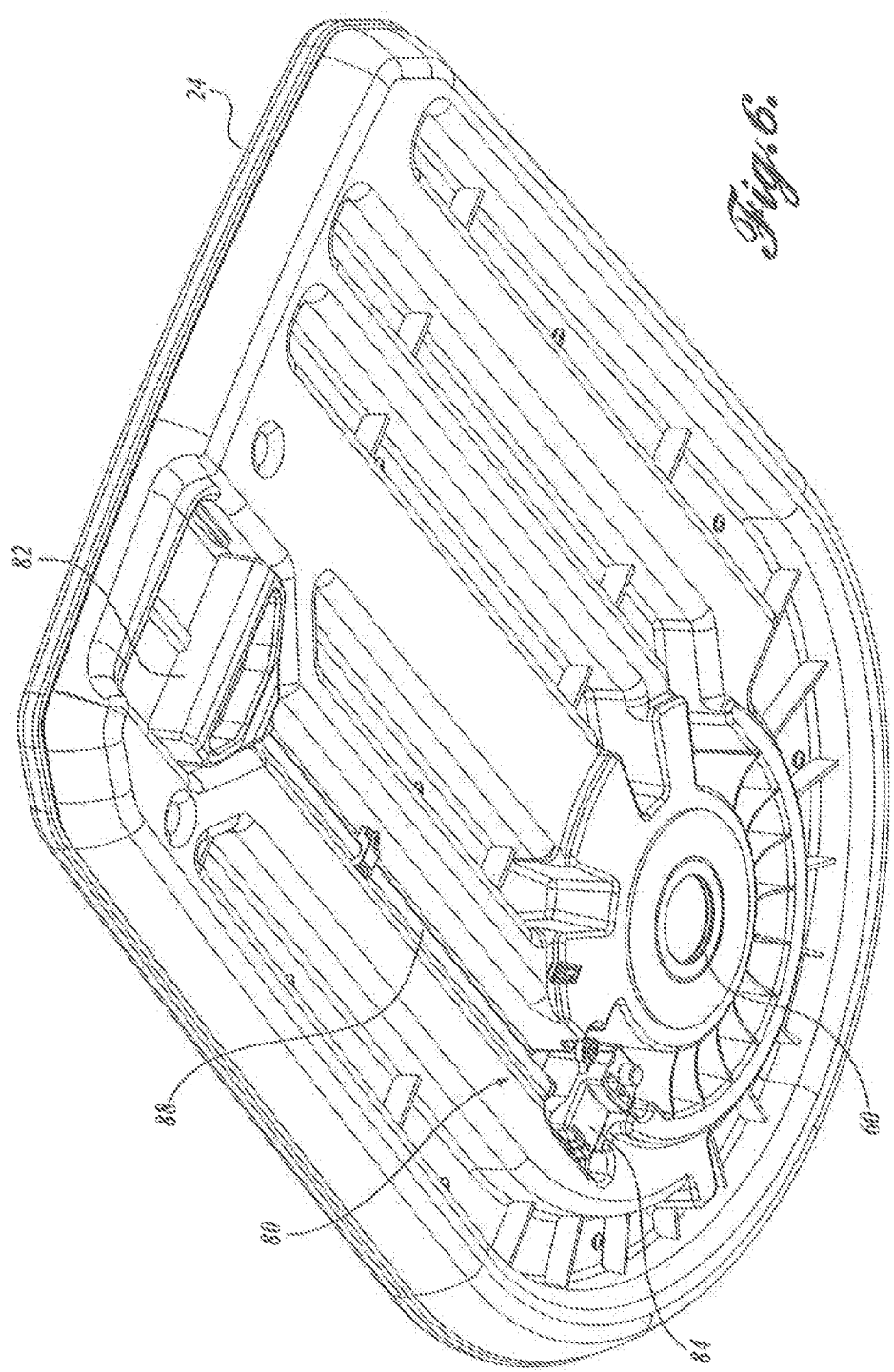

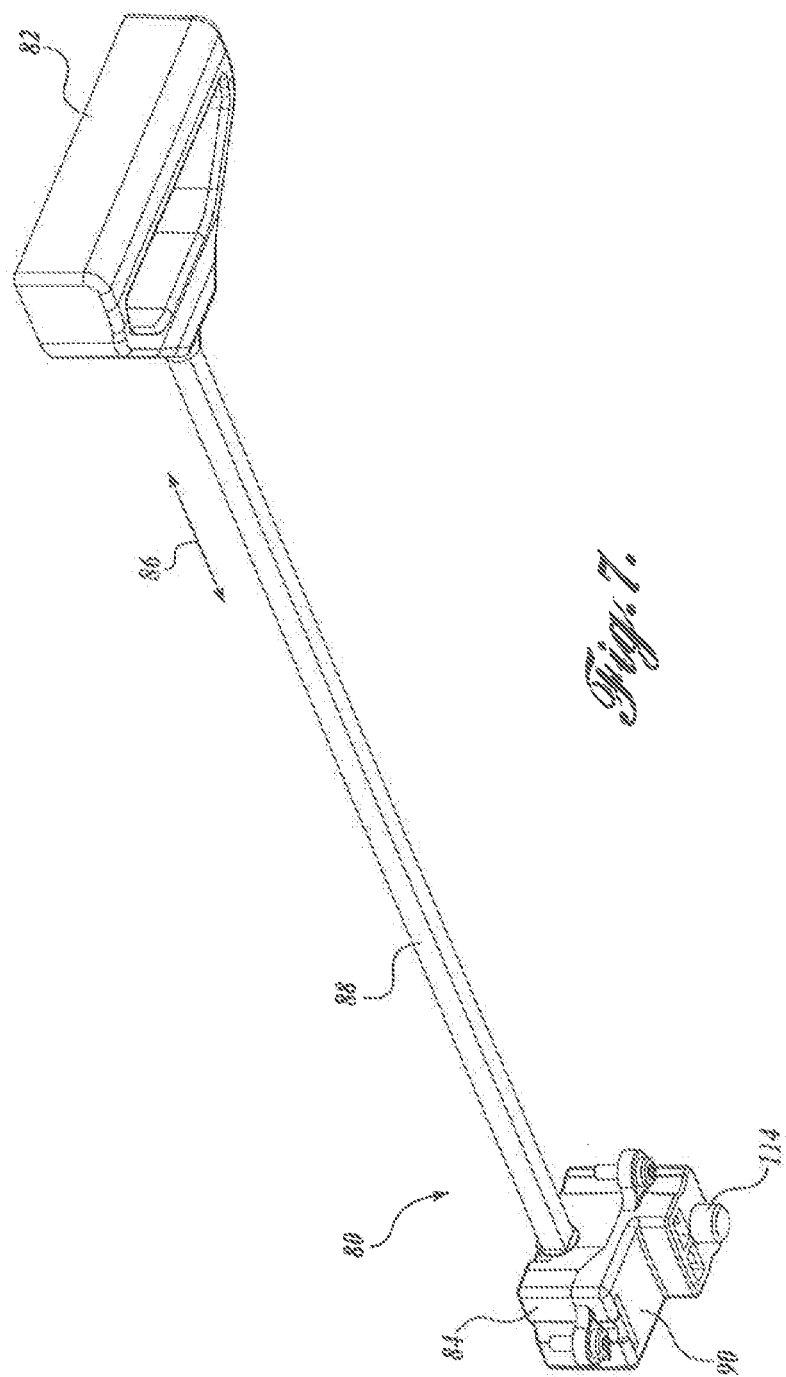

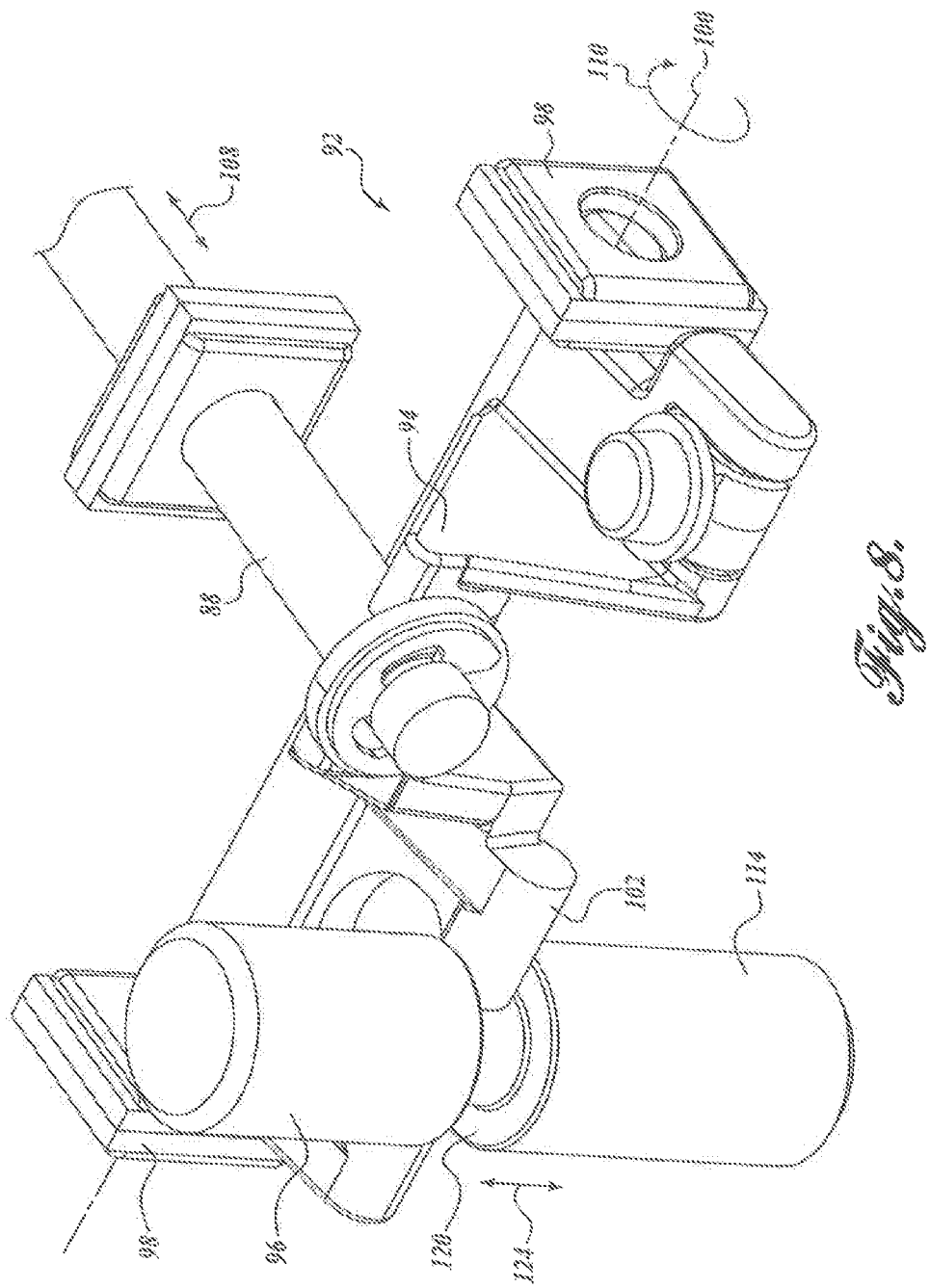

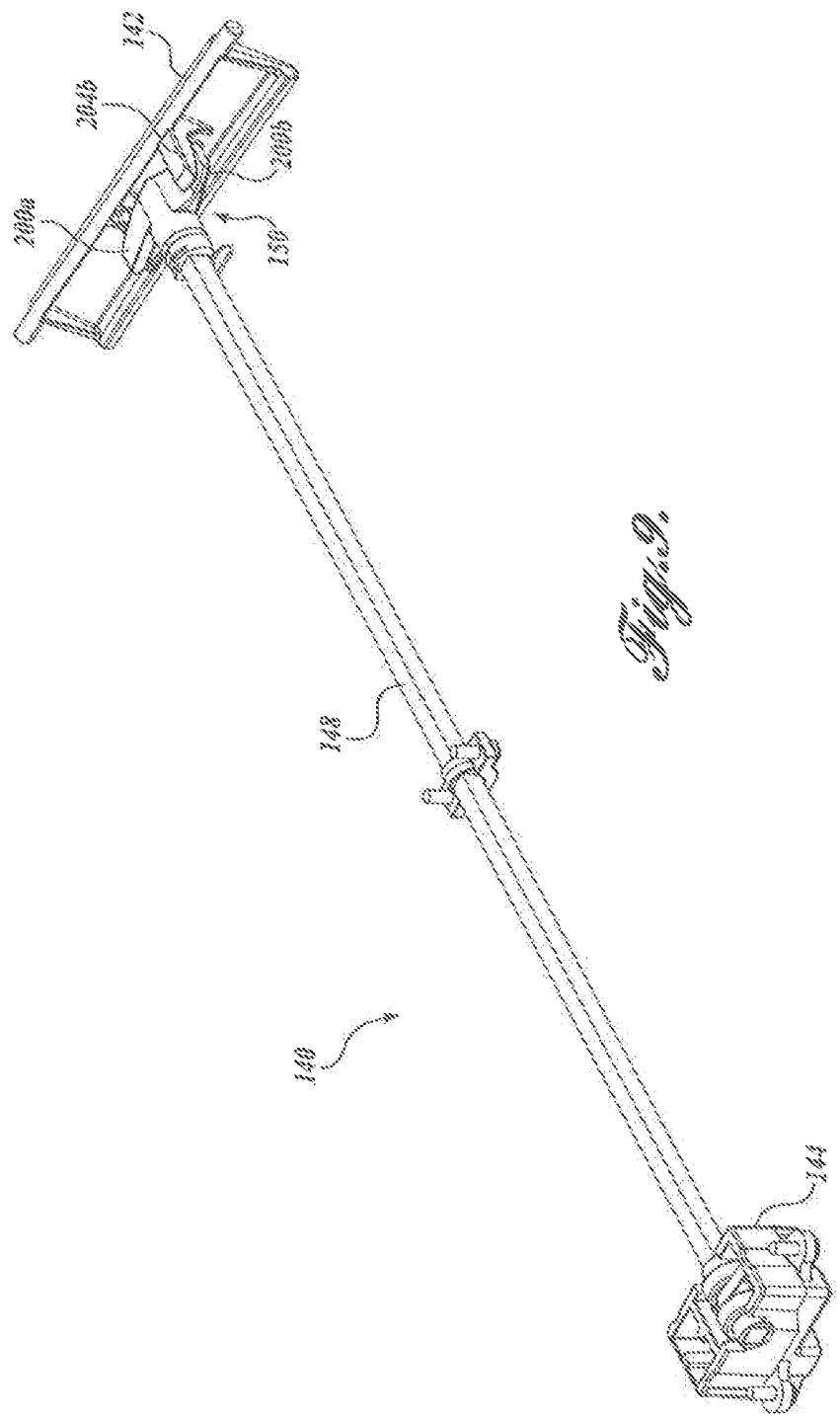

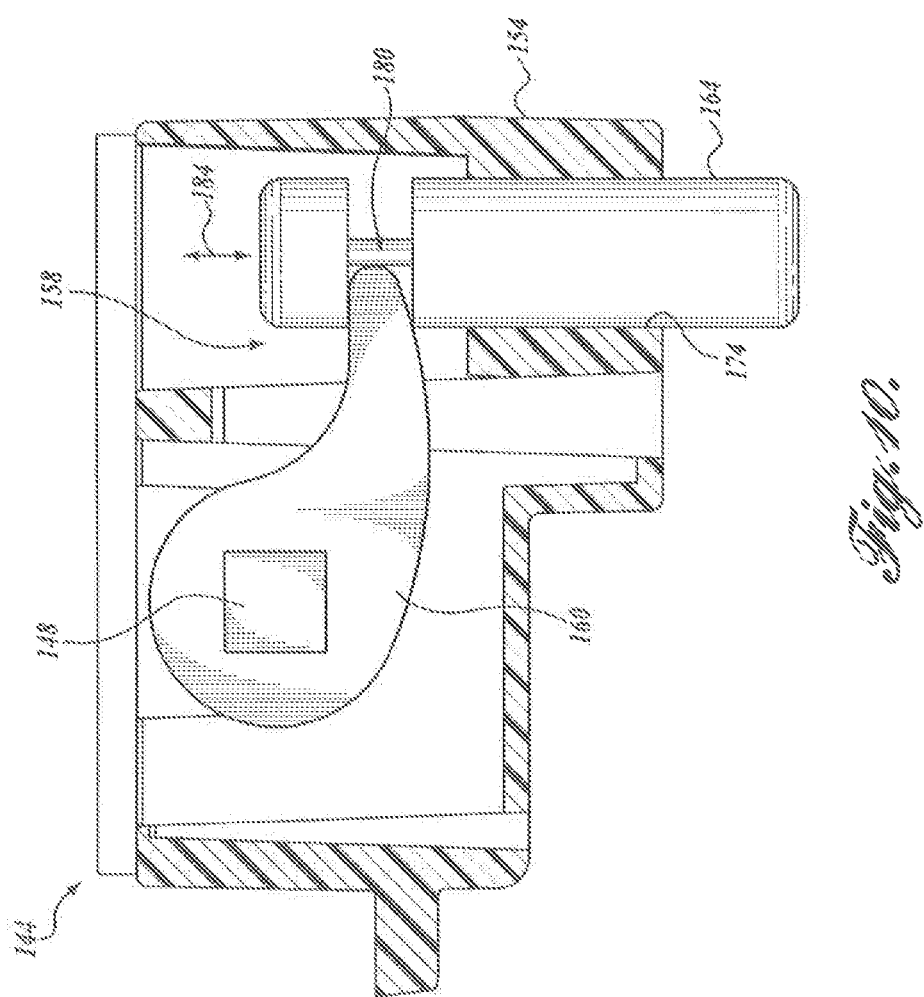

TABLE WITH A ROTATABLE TABLETOP

BACKGROUND

In confined spaces, tables may need to be moved or repositioned to create room to move therein. For instance, in a vehicle, such as in a sleeper portion of a tractor cab, tables may be moved around within the interior of the vehicle to provide space for an operator or passenger to move therein. In addition to moving tables within a confined space, previous solutions include tables having stowable tabletops. Such tabletops are typically supported along one side by hinges, which in some cases may also include support legs. When more space is desired, the tabletop is pivoted at the hinges about a horizontal axis so as to move from its horizontal position to a vertical position.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a table is provided for use in a vehicle. The table includes a vertical support structure configured to be coupled to an interior portion of the vehicle, a tabletop rotatably coupled to the vertical support structure such that the tabletop rotates about a longitudinal axis of the vertical support structure, and a latching mechanism configured to selectively lock and unlock the tabletop relative to the vertical support structure.

In accordance with another aspect of the present disclosure, a table mounted within an interior portion of a vehicle is provided. The table includes a support member having a lower end supported by the interior portion of the vehicle and an upper end, and a tabletop rotatably coupled to the support member proximate the upper end. The tabletop is rotatable about a longitudinal axis of the support member, wherein a planar support surface of the tabletop is orientated substantially parallel with a floor surface of the interior portion of the vehicle, and wherein the tabletop selectively rotates with respect to the support member between a plurality of fixed position.

In accordance with another aspect of the present disclosure, a table for use in a vehicle is provided. The table includes a support member configured to be connected to an interior portion of the vehicle, a tabletop, and means for rotatably coupling the tabletop to the support member, wherein the tabletop is rotatable about a longitudinal axis of the support member.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a bottom perspective view of one example of a tabletop in accordance with aspects of the present disclosure;

FIG. 7 is one example of a latch mechanism for use in a table, such as the table of FIG. 1, in accordance with aspects of the present disclosure;

FIG. 8 is a perspective view of one example of a latch suitable for use with the latch mechanism of FIG. 7;

FIG. 9 is another example of a latch mechanism for use in a table, such as the table of FIG. 1, in accordance with aspects of the present disclosure;

FIG. 10 is a cross sectional view of one example of a latch suitable for use with the latch mechanism of FIG. 9.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following discussion provides examples of a table having a rotatable tabletop that may be used in confined spaces, such as in vehicles. Generally described, one or more embodiments of the present disclosure are directed to tables having a vertical support structure and a tabletop that is rotatable relative to the vertical axis of the vertical support structure. One or more examples of the tables described herein may provide a moveable tabletop that is suitably supported to withstand significant forces applied to a surface thereof, thereby minimizing the amount of twisting or bending of the tabletop surface. In some embodiments, the rotatable tabletop is configured to lock and unlock at a variety of positions relative to the vertical support structure via a latch mechanism.

Although the examples of the tables having a rotatable tabletop may be described in reference for use within an interior of a vehicle, it is to be understood that the rotatable tabletop may be used in any environment. Furthermore, it should be appreciated that any vehicle described herein may include any powered or non-powered vehicle, including but not limited to heavy duty trucks, such as Class 8 vehicles, vans, mobile homes, trailers, boats, buses, and the like.

While some embodiments have been illustrated and described, it will be appreciated that various changes can be made therein without departing from the spirit and scope of the disclosure. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Additionally, it will be appreciated that embodiments of the present disclosure may employ any combination of the features described herein.

Figure 1:
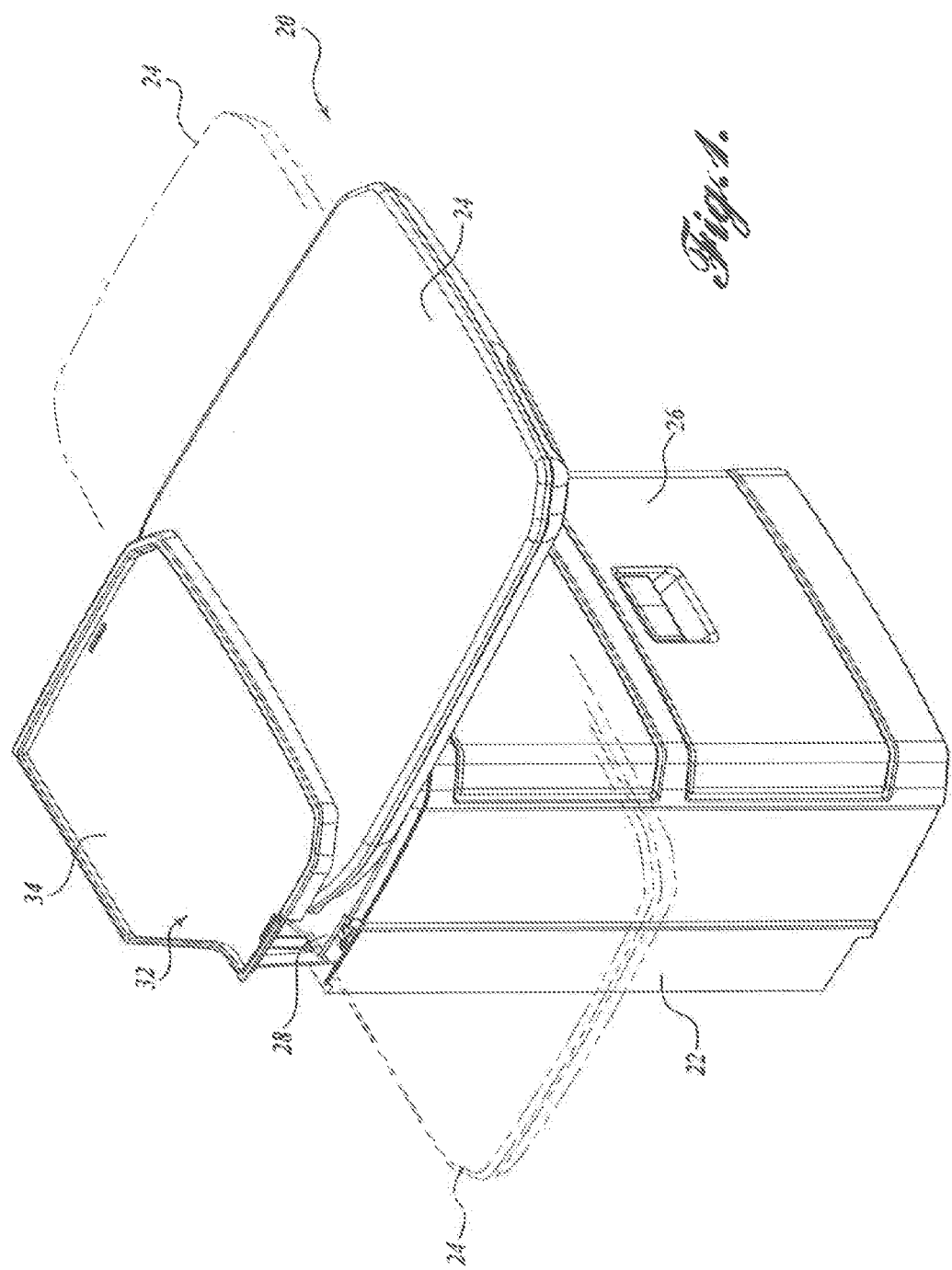
FIG. 1 is a top perspective view of a table in accordance with aspects of the present disclosure.
Figure 2:
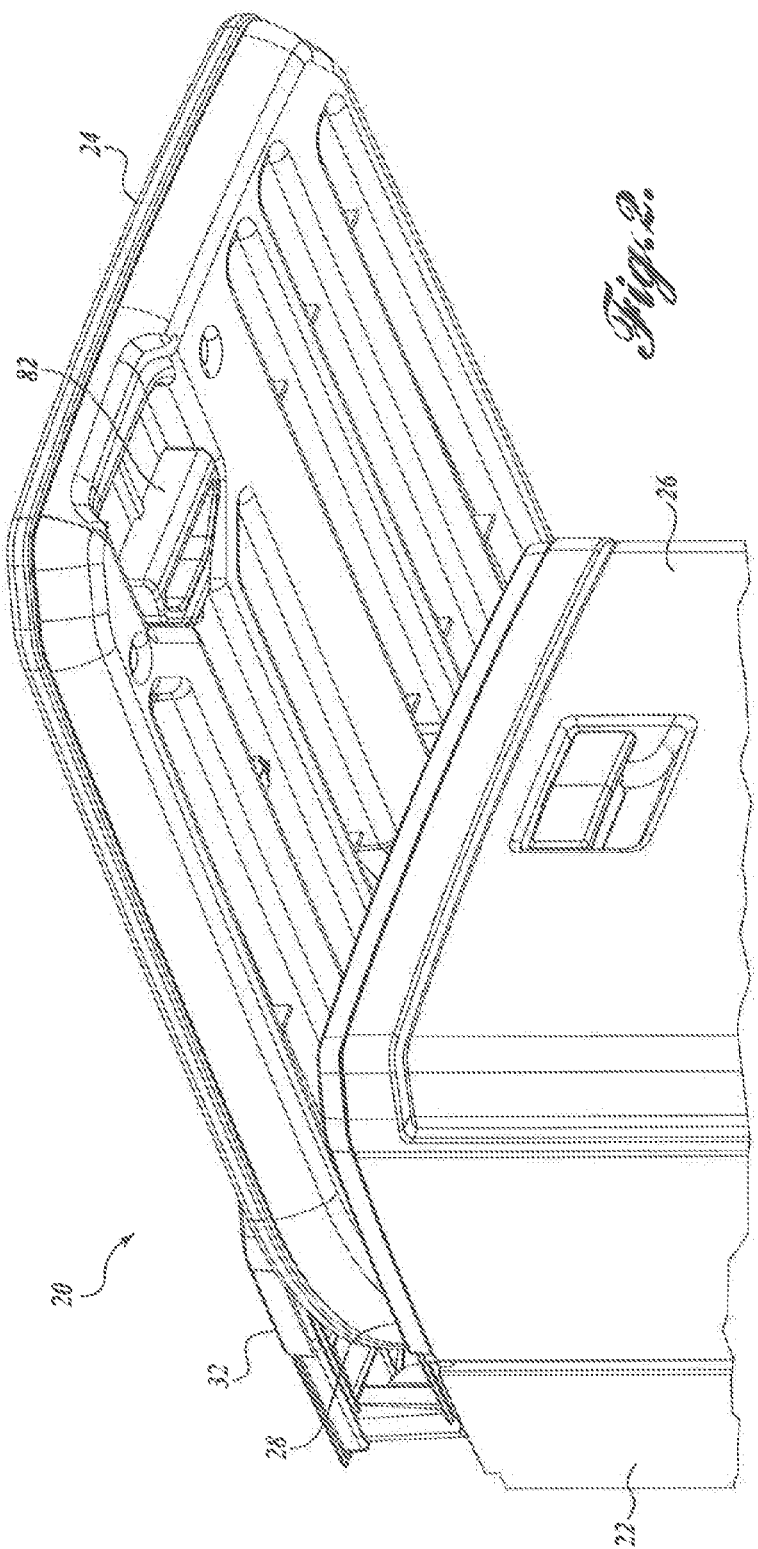
FIG. 2 is a partial bottom perspective view of the table of FIG. 1.
Figure 3:
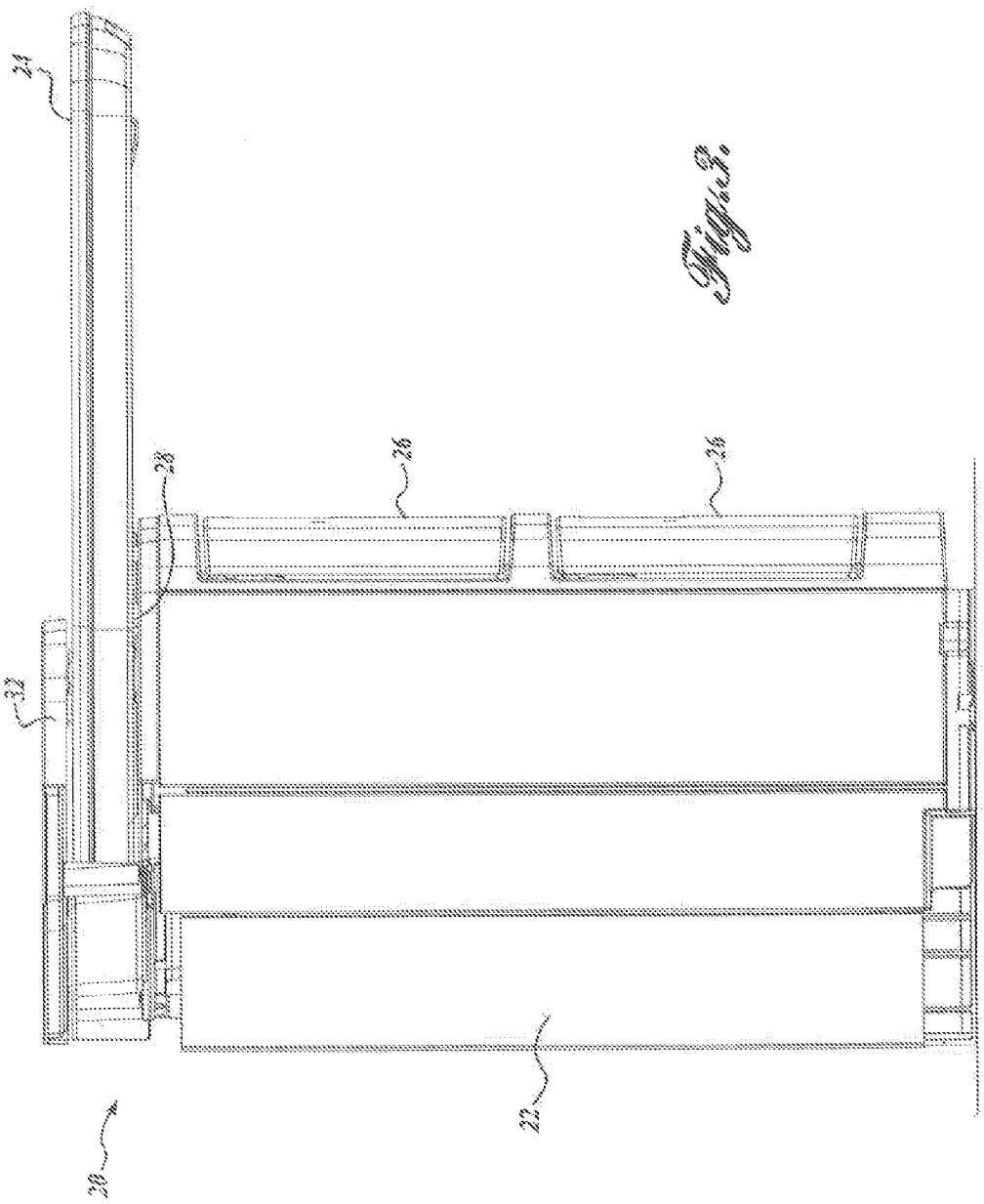
FIG. 3 is a side view of the table of FIG. 1.

Turning now to FIGS. 1-3, there is shown one embodiment of a table 20 in accordance with aspects of the present disclosure. As can be seen in FIGS. 1-3, the table 20 includes a vertical support structure 22 and a tabletop 24 rotatably coupled to the upper end of the vertical support structure 22. In the embodiment shown, the vertical support structure 22 is in the form of a cabinet that includes one or more (shown as two (2)) drawers 26 or the like. In use, for example, when more space is needed in the vehicle, the tabletop 24 is capable of rotating from a deployed position shown as solid lines in FIG. 1 to a stowed position, two of which are shown as dashed lines in FIG. 1. As will be explained in more detail below, some embodiments of the tabletop 24 are configured to index to a number of incremental positions about the vertical axis of the vertical support structure 22.

As described briefly above, the tabletop 24 is rotatably coupled to the upper end of the vertical support structure 22. In the embodiment shown, the tabletop 24 is rotatably coupled between an upper support surface 28 of the vertical support structure 22 and an optional top member 32. In some embodiments, the top member 32 is mounted a spaced distance above the upper support surface 28 of the vertical support structure 22 via suitable structure. In these embodiments, the top member 32 includes a top support surface 34 that works in conjunction with the tabletop 24 to provide a working surface to a user, such as a vehicle driver and or passenger during instances, for example, when the vehicle is parked.

Figure 4:
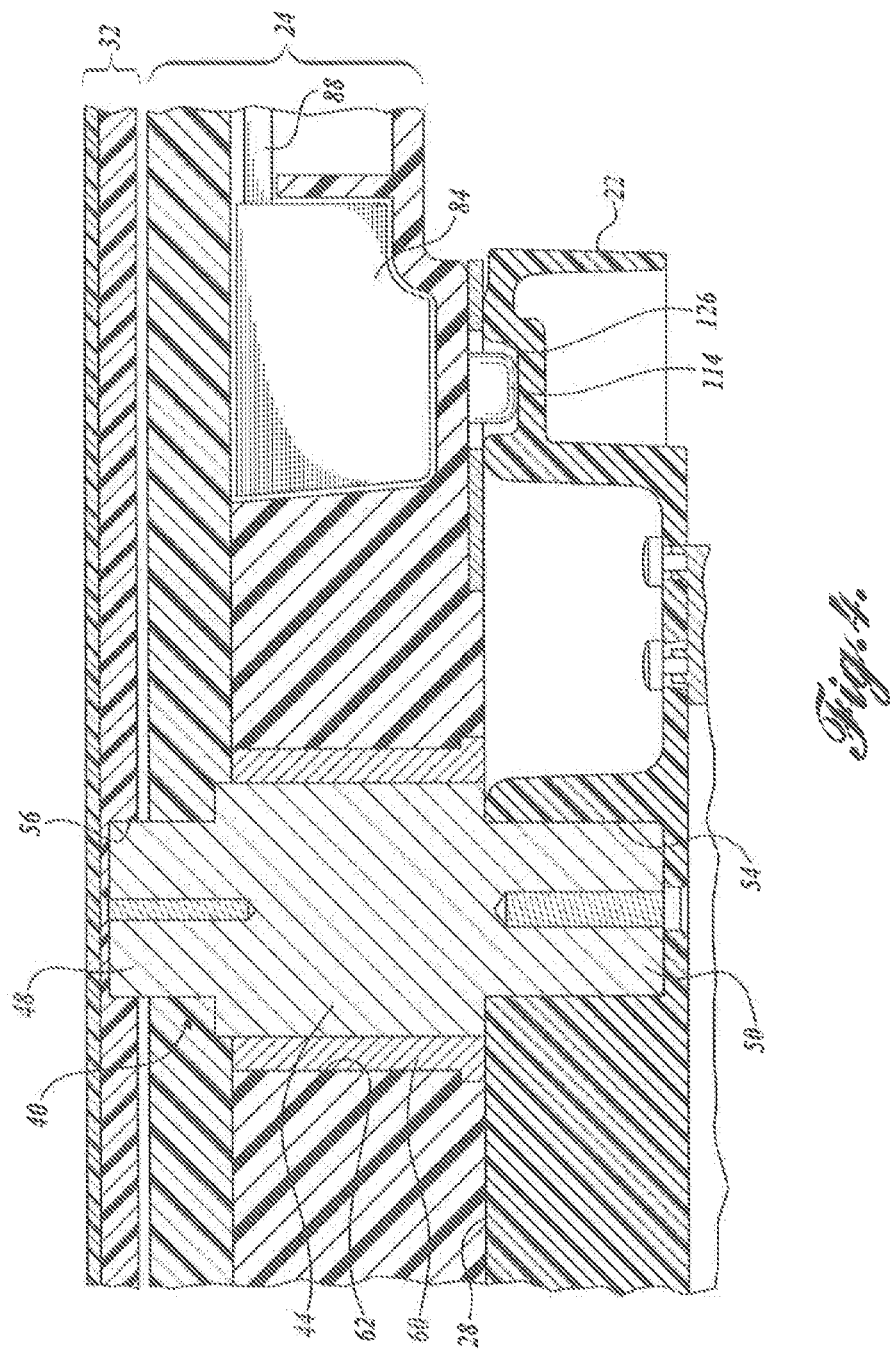
FIG. 4 is a schematic representation of a partial cross-sectional view of a table, such as the table of FIG. 1, the partial cross-sectional view depicting a first embodiment of a rotating mechanism formed in accordance with aspects of the present disclosure.
Figure 5:
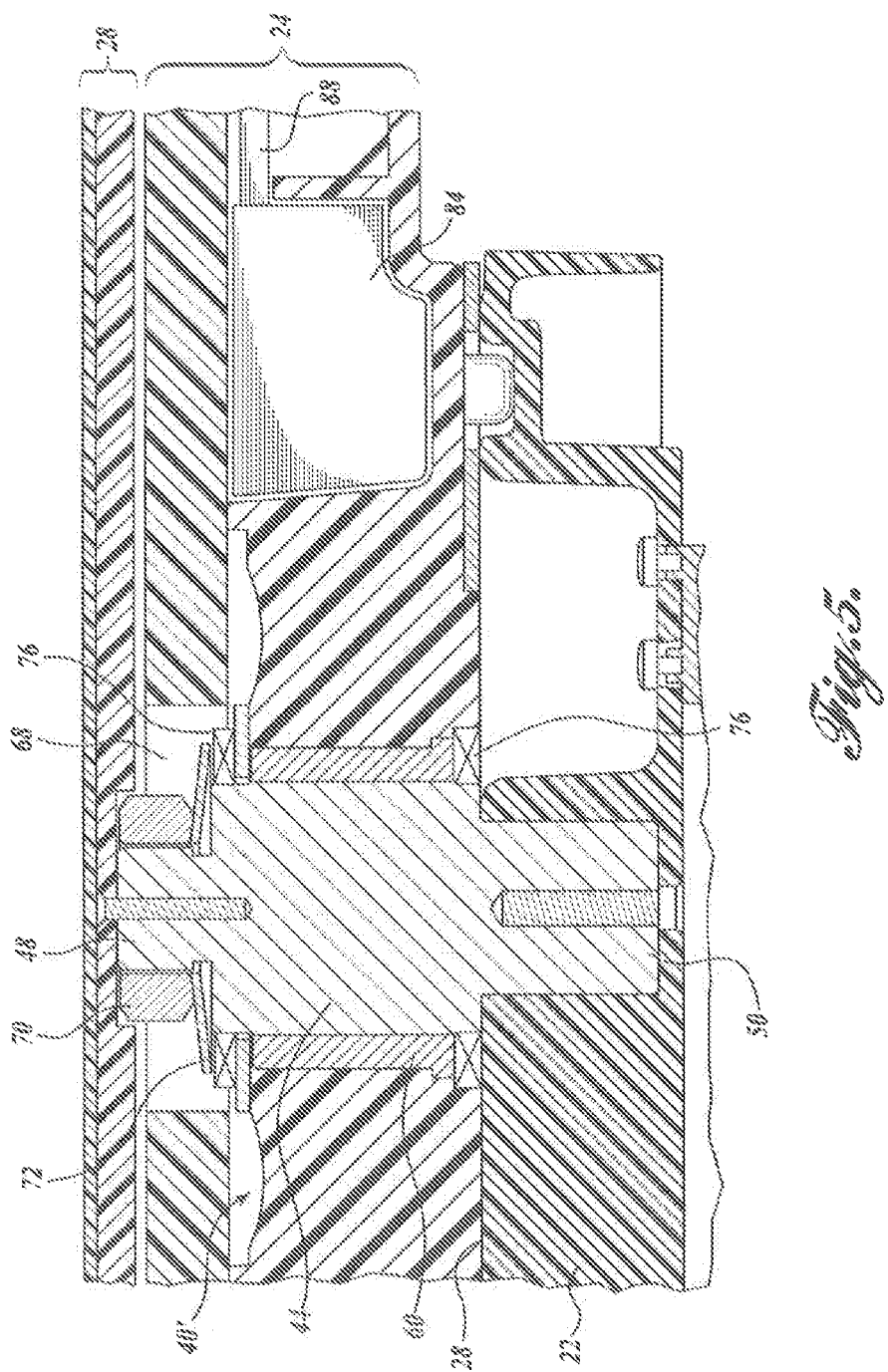
FIG. 5 is a schematic representation of a partial cross-sectional view of a table, such as the table of FIG. 1, the partial cross-sectional view depicting a second embodiment of a rotating mechanism formed in accordance with aspects of the present disclosure.

In accordance with aspects of the present disclosure, the tabletop 24 is rotatably coupled to the vertical support structure 22 about a vertical axis via a rotating mechanism, such as rotating mechanism 40 (See FIG. 4) or rotating mechanism 40' (See FIG. 5). It will be appreciated that the rotating mechanism may be any mechanism that enables the tabletop 24 to rotate in a clockwise and/or a counterclockwise direction about a vertical axis of the vertical support structure 22. In some embodiments, the rotating mechanism aims to support the moveable tabletop in a manner that withstands significant forces applied to a surface thereof, thereby minimizing the amount of twisting or bending of the tabletop surface.

In the embodiment shown in FIG. 4, one embodiment of the rotating mechanism 40 includes a rotary portion that is connected to or integrally formed with the tabletop 24 and a stationary portion that is connected to the vertical support structure 22 and/or the top member 32. The rotary portion may be configured to rotate about an outer surface or within an inner surface of the stationary portion. Therefore, when a radial force is applied to the tabletop 24, the tabletop 24 and rotary portion of the rotating mechanism 40 rotate relative to a vertical axis of the stationary portion, which, in turn, rotates the tabletop 24 about a vertical axis of the vertical support structure 22. In some embodiments, the optional top member 32 may conceal some of or all of the rotating mechanism.

Referring still to FIG. 4, the rotating mechanism 40 will be described in some detail. The stationary portion of the rotating mechanism 40 includes a spindle 44 having a middle section 46 and opposite first and second bosses 48, 50. The spindle 44 is mounted in a non-rotational manner with respect to the vertical support structure 22 and/or the top member 32. To assist in holding the spindle 44 stationary, at least one of the first and second bosses 48, 50 of the spindle 44 may be secured to the top member 32 or vertical support structure 22. In the illustrated embodiment, the second boss 50 of the spindle 44 is placed in a bore 54 disposed in the vertical support structure 22 and held in position by a threaded fastener (not shown). Similarly, the first boss 48 of the spindle 44 extends through a bore 56 in the top member 32 and is held in position by a threaded fastener (not shown). In other embodiments, the first and second bosses 48, 50 of the spindle 44 may be alternatively or additionally secured by threaded couplings, press fit, or the like.

In the illustrated embodiment of FIG. 4, the rotating portion of the rotating mechanism 40 includes a plain bearing, such as a sleeve or bushing 60, press fit or otherwise non-rotationally affixed within a cooperatingly sized through bore 62 of a section of the tabletop 24. As best shown in FIG. 4, the through bore 62 in one embodiment can extend from the upper surface 28 of the support structure 22. In some embodiments, the bushing 60 may be self-lubricating. Additionally or alternatively, the bushing 60 could be a flanged bushing as shown, thereby forming a thrust bearing against the upper support surface 28 of the vertical support structure 22. In other embodiments, the bushing 60 may be omitted, and thus, the rotating portion may include the through bore 62 that acts as a bearing surface defined by the tabletop 24. As assembled, the middle section of the spindle 44 is positioned within the internal bore of the bushing 60 as shown in FIG. 4 or the through bore of tabletop 24 (not shown). The bushing 60 (or bearing surface formed by the tabletop) is configured to rotate about a longitudinal axis of the spindle 44. In that regard, when a radial force is applied to the tabletop 24, the tabletop 24 rotates about the longitudinal axis of the spindle 44.

FIG. 5 illustrates another example of a rotating mechanism 40' according to aspects of the present disclosure. The rotating mechanism 40' is substantially similar in construction and operation as the rotating member 40 except for the differences that will now be described. As best shown in FIG. 5, the first boss 48 of the spindle 44 is positioned within an oversized opening 68 in the tabletop 24. As illustrated, a nut 70 is secured to the first boss 48 of the spindle 44 to provide a load force to the bushing 60 and a portion of the tabletop 24. A washer 72, such as a belleville washer, may be provided between the nut 70 and the bushing 60 to distribute the load force applied by the nut 70. To reduce friction between the rotating surfaces of the bushing 60 and an adjacent non-rotating surface, such as the upper support surface 28 of the vertical support structure 22 and washer 72, thrust bearings 76 may be provided. Non-limiting examples of suitable thrust bearings may include a thrust bearing of the needle bearing type, the roller bearing type, or the ball bearing type. Other embodiments may use a flanged bushing and/or the like.

In accordance with other aspects of the present disclosure, the table 20 may further include a latch mechanism 80 (see FIGS. 6-10) for providing selective rotation of the tabletop 24 relative to the vertical support structure 22. The selective rotation may be between a deployed position (solid lines, FIG. 1) and a stowed position (dashed lines, FIG. 1) or between a number of positions as the tabletop 24 rotates from the deployed to the stowed position and vice versa. For instance, the tabletop 24 may be unlocked via actuation of the latch mechanism 80 at a first position, such as the one shown in solid lines in FIG. 1, so that the tabletop 24 may be rotated and then subsequently locked via de-actuation of latch mechanism 80 into a second position, such as one of those shown in dashed lines in FIG. 1. The latch mechanism 80 may be any mechanism that is configured to conditionally allow rotation of the tabletop 24 relative to the vertical support structure 22. In some embodiments, the tabletop 24 may be selectively rotated through a plurality of indexed positions. The indexed positions may have equal radial spacings of approximately 15 degrees, for example, or may have non-equal spacings.

Turning now to FIGS. 6-8, there is shown one embodiment of a latch mechanism 80 in accordance with aspects of the present disclosure. As best shown in FIG. 6, the latch mechanism 80 is carried by the tabletop 24. The latch mechanism includes a latch handle 82 and a latch assembly 84, as shown in FIGS. 6 and 7. The latch handle 82 is secured to a first end of a linkage or bar 88 and is mounted for linear movement in the directions of arrows 86 (see FIG. 7). The opposite or second end of the bar 88 is routed into the latch assembly 84. The latch assembly 84 includes a plunger box 90 that houses a latch 92 as shown in FIG. 8. As best shown in FIG. 8, one embodiment of the latch 92 includes a lever 94 and a latch pin 96. The lever 94 is pivotably mounted in the plunger box 90 via suitable structure 98 about pivot axis 100. The lever 94 includes projection 102 that interfaces with the latch pin 96. The opposite end of the bar 88 is coupled to lever 94 such that movement of the bar 88 in the direction of the arrow 108 rotates the lever 94 in the direction of arrows 110 about axis 100.

The latch pin 96 is oriented so as to have its longitudinal axis substantially parallel to the vertical axis of the vertical support structure and orthogonal to the pivot axis 100 of lever 94. The first end 114 of the latch pin 96 is configured to extend from an opening in the plunger box 90 and engage with one or more voids 126 (See FIG. 4) disposed in or associated with the vertical support structure 22, thereby locking the tabletop 24 in one of the plurality of fixed positions (e.g., deployed position, stowed position, etc.). The latch pin 96 includes a notch 120 or the like that interfaces with the projection 102 of the lever 94. According, as the lever 94 pivots about the pivot axis 100 via linear movement of the bar 88, the projection 102 engages with the notch 120, causing the latch pin 96 to move in the direction of arrows 124. Selective movement of the latch pin 96 thereby prohibits rotation (locks) and permits rotation (unlocks) of the tabletop 24 with respect to the support structure 22. Accordingly, by pulling outwardly on the handle 82, the latch pin 96 retracts from void 126 associated with the vertical support structure 22, which allows the tabletop to rotate with respect to the vertical support structure 22. Conversely, when pushing inwardly on the handle 82, the latch pin 96 extends into a void 126 associated with the vertical support structure 24, which inhibits the tabletop 24 from rotating rotate with respect to the vertical support structure 22.

The voids 126 in the upper support surface 28 of the vertical support structure 22 are positioned so as to align with the latch pin 96 as the tabletop 24 rotates relative to the vertical support structure 22. In that regard, the voids 96 may be provided in a circular or semi-circular pattern. In some embodiment, the voids 96 are spaced apart from each other in fixed increments in the range of between 10 and 30 degree relative to the vertical axis of the vertical support structure 22.

FIGS. 9-10 illustrate another embodiment of a latch mechanism 140 that may be practiced with embodiments of the present disclosure. The latch mechanism 140 includes a latch handle 142 and a latch assembly 144. The latch handle 142 is coupled to a first end of a rotatable bar 148 via a linear-to-rotating mechanism 150. The linear-to-rotating mechanism 150 may be activated by moving the latch handle 142 inwardly or outwardly in a linear manner with respect to the bar 148.

The opposite or second end of the rotatable bar 148 is routed into the latch assembly 144. The latch assembly 144 includes a plunger box 154 that houses a latch 158. The latch 158 includes a lever 160 and a latch pin 164. The latch pin 164 is oriented so as to have a longitudinal axis substantially parallel to the vertical axis of the vertical support structure and orthogonal to the rotatable bar 148. The latch pin 164 is configured to extend from an opening 174 in the plunger box 154 and engage with one or more voids 126 (See FIG. 4) disposed in or associated with the vertical support structure 22, thereby locking the tabletop 24 in one of the plurality of fixed positions (e.g., deployed position, stowed position, etc.).

The latch pin 164 also includes a notch 180 or the like that interfaces with the outer tip of the lever 160. According, as the lever 160 co-rotates with the rotatable bar 148, the lever 160 engages with the notch 180, causing the latch pin 164 to move in the direction of arrows 184. Selective movement of the latch pin 164 thereby prohibits rotation (locks) and permits rotation (unlocks) of the tabletop 24 with respect to the support structure 22.

To cause the pin 190 to retract or extend, the latch handle 142 may be pulled outwardly or pushed inwardly, respectively, which in turn, causes the bar 148 to rotate via the linear-to-rotating mechanism 150. The linear-to-rotating mechanism 150 may be any mechanism that will convert the linear motion of pushing the latch handle 142 inwardly or pulling the latch handle 142 outwardly into rotary motion to rotate the rotatable bar 148.

In the illustrated embodiment, the linear-to-rotating mechanism 150 includes cam levers 200a, 200b that extend in opposite directions from the bar 182. A back surface of the latch handle 142 includes first and second cam members 204a, 204b (cam member 204a is hidden in FIG. 9) that are configured to engage with a respective cam lever 200a, 200b. When the latch handle 142 is pushed inwardly, the first member 204a engages with the lever 200a thereby causing the bar 148 to rotate in a first (e.g., clockwise) direction. Similarly, when the latch handle 142 is pulled outwardly, the second member 204b engages with lever 200b thereby causing the bar 148 to rotate in a second, opposite (e.g., counterclockwise) direction.

In response to the bar 148 rotating in a second direction, the latch pin 164 recedes linearly through the opening 174, thereby disengaging the latch pin 164 from a void 126 in the vertical support structure 22. While the pin 164 is disengaged with the void 126, the tabletop 24 may rotate relative to the vertical support structure 22 in response to a force being applied thereto. In response to the bar 148 rotating in a first direction, the latch pin 164 extends linearly through the opening 174, thereby engaging a void 126 in the vertical support structure 22. While the latch pin 164 is engaged with the void 126, the tabletop 24 is prohibited from rotating relative to the vertical support structure 22 in response to a force being applied thereto. It will be appreciated that the bar 142 may be biased in the locked or latch pin engaged position.

In operation, by pulling outwardly on the handle 142, for example, from a first position to a second position, the latch pin 164 retracts from void 126 associated with the vertical support structure 22, which allows the tabletop to rotate with respect to the vertical support structure 22. Thereafter, when returning the handle from the second position to the first position by pushing inwardly on the handle 142, the latch pin 164 extends into a void 126 associated with the vertical support structure 24, which inhibits the tabletop 24 from rotating rotate with respect to the vertical support structure 22.

It will be appreciated that other configurations may be practice with embodiments of the present disclosure to rotate the bar 148. For example, the latch handle 142 may include an interface configured to telescopingly receive the outer end of the bar 148 in a rotationally keyed manner. As such, the interface allows the handle 142 to freely slide inwardly and outwardly with respect with the bar 148 but co-rates with the bar 148. In operation, the latch handle 142 can be slid outwardly away from the tabletop 24 until its clear from interference therefrom. Once clear from interference, the latch handle 142 can be rotated, thereby causing rotation of the bar 148, and movement of latch pin 164. In one embodiment, the latch handle can be biased against outward movement.

In yet another embodiment, the latch handle 142 may be configured to include a transversely orientated shaft that is pivotably coupled to the tabletop about an axis orthogonal to the longitudinal axis of the bar 148. The shaft can be configured with a first bevel gear that cooperates with a second bevel gear mounted to the end of the bar 148 for rotation therewith. In use, when the latch handle 142 is rotated about the axis of the shaft, the first bevel gear fixed to the shaft rotates the second bevel gear, which in turn, rotates the bar 148. Rotation of the bar causes the latch pin 164 to recede from and extend into the voids 126, as described above.

In some embodiments, a portion of the table 20 may be adapted to be secured via fasteners, brackets, or other suitable securing methods, to an inner portion of an associated vehicle or to a component, such as a seat, that is secured to an inner portion of the vehicle. In other embodiments, however, the table 20 may be free standing within the vehicle. In such embodiments, the bottom of the table may be suitable shaped, such as substantially flat, to support the table 20 in an upright position.

Although the illustrated embodiment shows the tabletop 24 as being substantially rectangular in shape, it is to be appreciated that other suitable shapes may be used. Non-limiting examples include oval, oblong, square, circular, pentagonal, or other suitable shapes. It is to be appreciated that the tabletop 24 is separable from the vertical support structure 22 and therefore may be formed from a different material than the vertical support structure 22.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A table for use in a vehicle, comprising:
   a vertical support structure configured to be coupled to an interior portion of the vehicle;
   a tabletop rotatable coupled to the vertical support structure such that the tabletop rotates about a longitudinal axis of the vertical support structure; and
   a latching mechanism configured to selectively lock and unlock, the tabletop relative to the vertical support structure, wherein the latching mechanism comprises:
      a pin configured to move in a direction substantially parallel to the longitudinal axis of the vertical support structure to engage with one or more voids in a surface of the vertical support structure to lock the tabletop relative to the vertical support structure, and
      a latch handle operatively coupled to the pin and configured to cause the pin to disengage from the one or more voids when the latch handle is moved in a direction substantially perpendicular to the longitudinal axis of the vertical support structure.

2. The table of claim 1, wherein the one or more voids are on an upper surface of the vertical support structure.

3. The table of claim 2, wherein the one or more voids include a plurality of voids on the upper surface of the vertical support structure, and wherein each of the voids are spaced apart from one another in a circular or semi-circular manner.

4. The table of claim 1, wherein the latch handle is configured to disengage with the one or more voids by pulling the latch handle outwardly or by pushing the handle inwardly.

5. The table of claim 1, wherein the tabletop includes an aperture extending from a top surface to a bottom surface, the table further comprising:
   a spindle fixed to the vertical support structure; and
   a bushing located in the aperture of the tabletop and configured to rotate about the spindle, wherein when the bushing, rotates about the spindle, the tabletop rotates about the longitudinal axis of the vertical support structure.

6. The table of claim 5, wherein the longitudinal axis of the vertical support structure comprises a central longitudinal axis of the spindle.

7. A table mounted within an interior portion of a vehicle, the table comprising:
   a support member having a lower end supported by the interior portion of the vehicle and an upper end; and
   a tabletop rotatably coupled to the support member proximate the upper end, the tabletop rotatable about a longitudinal axis of the support member, wherein a planar support surface of the tabletop is orientated substantially parallel with a floor surface of the interior portion of the vehicle, and wherein the tabletop selectively rotates with respect to the support member between a plurality of fixed positions; and
   a latching mechanism configured to conditionally permit and prohibit rotation of the tabletop with respect to the support member between the plurality of fixed positions, the latching mechanism comprising:
      a handle carried by the tabletop, and
      a pin configured to engage with a plurality of voids in an upper surface of the support member,
      wherein movement of the handle in a direction substantially parallel to the tabletop causes the pin to move in a direction substantially perpendicular to the tabletop to disengage the pin from one of the plurality of voids to allow the tabletop selective rotation with respect to the support member.

8. The table of claim 7, wherein the number of fixed positions are spaced substantially equidistant from each other.

9. The table of claim 7, further comprising means for rotatably coupling the tabletop to the support member.

10. The table of claim 7, wherein movement of the handle in the direction substantially parallel to the tabletop is accomplished when the handle is at least one of pushed inwardly and pulled outwardly.

11. The table of claim 7, wherein the tabletop is configured to rotate 180 degrees relative to the longitudinal axis of the support member.

12. A table for use in a vehicle, the table comprising:
   a support member configured to be connected to an interior portion of the vehicle, the support member having an upper surface;
   a tabletop; and
   means for rotatably coupling the tabletop to the support member, wherein the tabletop is rotatable about a longitudinal axis of the support member, the longitudinal axis being substantially perpendicular to the upper surface of the support member;

wherein the upper surface of the support member comprises one or more voids; and wherein the tabletop comprises at least one pin extending into one of the one or more voids of the upper surface of the support member and a handle that, when moved in a direction substantially parallel to the upper surface, causes the at least one pin to retract from the one of the one or more voids.

13. The table of claim 12, wherein rotating mechanism includes a bushing secured to the tabletop that is configured to rotate about a spindle secured to the support member.

14. The table of claim 12, wherein the tabletop rotatably coupled an upper surface of the support member.

15. The table of claim 12, wherein the tabletop is selectively rotatable with respect to the support member between a plurality of fixed positions.

16. The table of claim 12, further comprising means for selectively rotating the tabletop with respect to the support member.

17. The table of claim 16, wherein said means for selectively rotating the tabletop includes a latch handle and a latch assembly.

* * * * *